March 4, 1924.

C. A. NASH

SIGNALING SYSTEM

Filed Sept. 28, 1921

1,485,869

2 Sheets-Sheet 1

Inventor:
Charles A. Nash,
By Dyrenforth, Lee, Chritton & Wiles
Attys.

March 4, 1924.

C. A. NASH 1,485,869

SIGNALING SYSTEM

Filed Sept. 28, 1921    2 Sheets-Sheet 2

Inventor,
Charles A. Nash,
By Dyrenforth, Lee, Chritton & Wiles,
Attys

Patented Mar. 4, 1924.

1,485,869

UNITED STATES PATENT OFFICE.

CHARLES A. NASH, OF CHICAGO, ILLINOIS, ASSIGNOR OF THREE-FOURTHS TO AMREVO ELECTRIC COMPANY, OF CHICAGO, ILLINOIS, A CORPORATION OF ILLINOIS, AND ONE-FOURTH TO SEYMOUR STEDMAN, OF CHICAGO, ILLINOIS.

SIGNALING SYSTEM.

Application filed September 28, 1921. Serial No. 503,802.

*To all whom it may concern:*

Be it known that I, CHARLES A. NASH, a citizen of the United States, residing at 2309 Archer Avenue, Chicago, in the county of Cook and State of Illinois, have invented a new and useful Improvement in Signaling Systems, of which the following is a specification.

My invention relates to improvements in signaling systems, and more especially to a direct current signaling system. My object is to provide means by which a relatively high voltage direct current service line may be made to energize a relatively low voltage signaling circuit.

Figure 1:
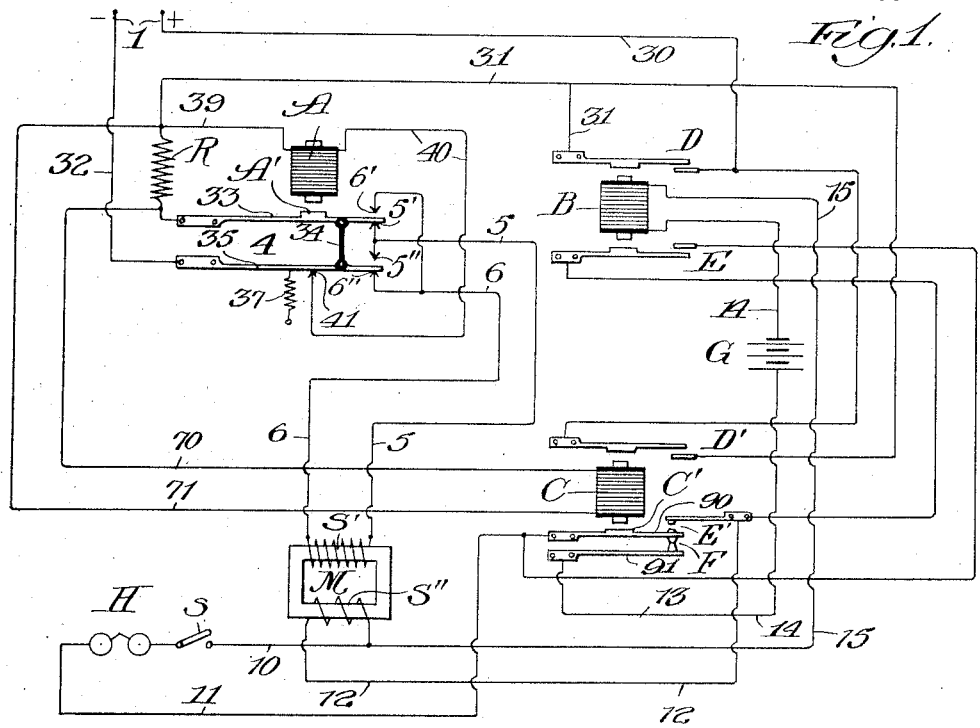
Figure 2:
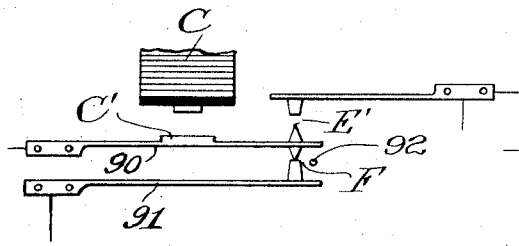
Figure 3:
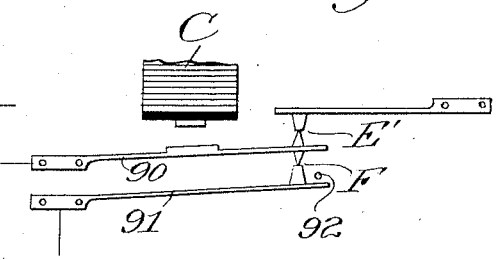
Figure 4:
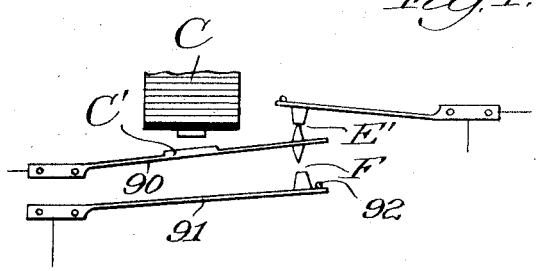
Figure 5:
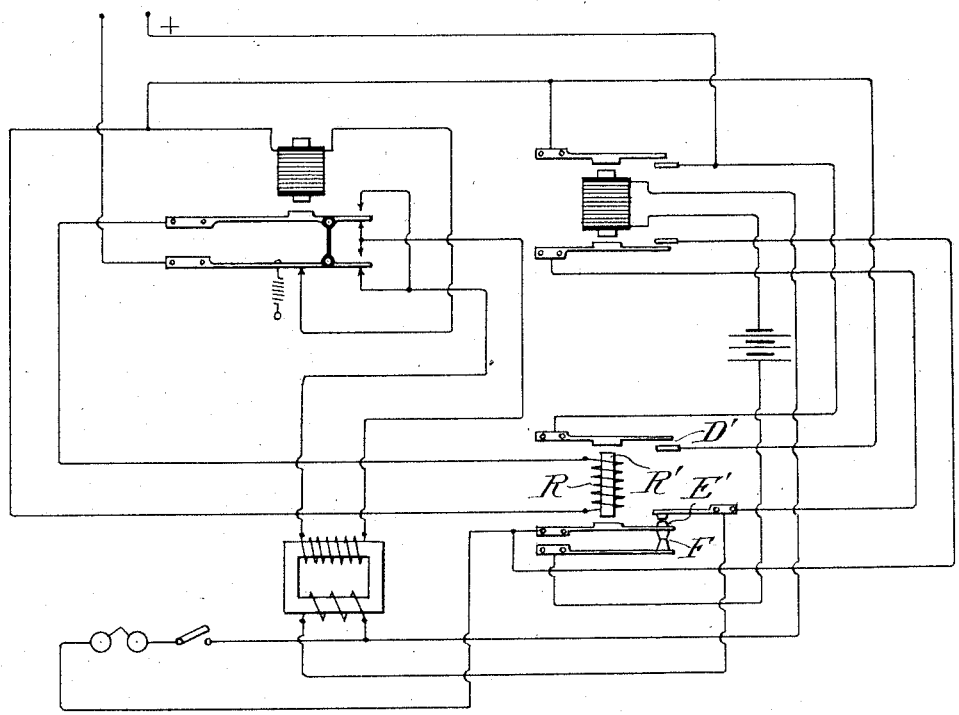

The invention will be fully understood from the following specification taken in connection with the accompanying drawings, in which Figure 1 is a diagrammatic view of a signaling system designed in accordance with the invention, Figure 2 is a similar view on an enlarged scale of a part of the mechanism, Figure 3 is a view similar to Fig. 2 showing the parts in an altered position, Figure 4 is a view similar to Fig. 3 showing the parts in an altered position, and Figure 5 is a view similar to Fig. 1 showing a modified form of the device.

Referring to the drawings, the numeral 1 designates a relatively high voltage direct current circuit, as for example a 110 volt city service line. In series with this line is a switch D, connected on one side to one of the direct current circuit wires by the wire 30 and on the other side by the wire 31 to a pole-changing device indicated in general by 4 and adapted to direct the flow of current alternately through the wires 5 and 6. One of the wires 5 and 6 is connected to each end of a primary coil S' of a transformer M. A return is afforded from the pole-changer through the wire 32, to the other side of the direct current service circuit 1.

I will now describe the construction and operation of the pole-changer 4. For the purpose of this description, I will assume that the switch D is closed in order to give a circuit through the wires 30 and 31. The circuit from the service line leads through the wire 30, the switch D, the wire 31, the resistance coil R (the purpose of which will be explained hereinafter) and is connected to the arm 33 of the pole-changer. The end of the arm 33 is adapted for vibration between the points 5' and 6', which are connected to the wires 5 and 6 respectively. Connected to the arm 33 by a nonconducting bar 34 is another arm, arranged parallel, as indicated by 35, the end of which is adapted to vibrate between the points 6" and 5" connected to the wires 6 and 5, respectively. The other end of the arm 35 is connected to the wire 32, leading back to the direct current service circuit. The arms 33 and 35 are normally held in the position shown in Fig. 1 by a small spring 37. When in such position the end of the arm 33 is in contact with the point 5', and the end of the arm 35 is in contact with the point 6'. When in this position current will flow from one side of the direct service line (indicated by the positive sign) through the wire 30, switch D, wire 31, resistance coil R, arm 33, wire 5, through the primary coil S', and return from the primary coil S', through the wire 6, through the arm 35, and wire 32 back to the other side of the direct current service circuit. When the arms 33 and 35 are moved so that their ends are in contact with the points 6' and 5", respectively, it is obvious that current through the primary coil S' will be reversed. This movement of the arms 33 and 35 is accomplished in the following manner. A wire 39 leads from the wire 31, where it joins the resistance coil R, to the magnetic coil A, through this coil, and thence by the wire 40 to the point 41 which is in electrical contact with the arm 35 when its end is in contact with the point 6", as shown in Fig. 1. When the arm 35 moves to make contact with the point 5" and breaks contact with the point 6", it also breaks contact with the point 41. It will be seen, that by this construction, a shunt flow of current will go through the magnetic coil A. This coil when energized is adapted to draw toward it the armature A' fastened on the arm 33. This movement will move the ends of the arms 33 and 35, causing them to make contact with the point 6' and 5", respectively, and slightly extend the spring 37. This movement will also break contact between the arm 35 and point 41, thus cutting off the flow of current through the coil A', with the result that the spring 37 will again draw the armature away from the coil A, break the contacts between the points 6' and 5" and restore the contacts between the points 5' and 6". It will be seen, therefore, that when the switch D is closed, there will be a rapid vibration of the arms 33 and 35 of the pole-changer 4, causing rapid reversal of direction of flow of current through the primary coil S'.

The transformer M is also provided with a secondary winding S". As is shown diagrammatically in the drawings, the number of turns of the secondary winding S" is much less than the number of turns in the primary winding S', so that the transformer operates as a step-down transformer, the proportionate number of turns in the windings being calculated to give the desired voltage for actuation of the signaling device or devices to which it is connected.

In series with the secondary coil S" of the transformer M, is a signaling circuit leading through the wire 10 to a control switch such as, to a push-button switch S or similar device, thence to a signaling apparatus, such as for example, the bell H. This circuit leads from the bell H by the wire 11 to the switch E', through this switch and back by the wire 12 to the other side of the secondary coil S".

An auxiliary, or starting, signaling circuit is also provided as follows—from the wire 11, through the switch F, through the wire 13, to the battery G, from the battery G by the wire 14, to the magnetic coil B, from the coil B by the wire 15, to the wire 10, and thence through the switch S and bell H.

In parallel with the switch D is a switch D'. In parallel with the switch E' is a switch E. The magnetic coil C is connected to the two ends of the resistance coil R by two wires 70 and 71.

The coil B, when energized, operates to close the switches D and E. These switches are under a slight spring tension, so that when current is cut off through the coil B, they will open. The coil C, when energized, likewise closes the switch D', but automatically opens as soon as current ceases flowing through the coil. The coil C, when energized, also operates the switches E' and F in the following manner. When current flows through the coil it draws toward it the armature C' on the arm 90. The arm 91 lies parallel to the arm 90 and their ends form the switch F. The arm 91 is under a slight spring tension toward the arm 90, holding the contact F closed. When the armature C' is drawn toward the magnet C, the arm 91 follows the arm 90, holding the contact F closed until a short time after the contact E' closes. Further travel of the arm 91 is prevented by the stop 92, with the result that shortly after the contact E' closes the contact F opens. The successive steps of this operation, is shown in Figs. 2, 3 and 4. Fig. 2 shows the contacts as they are when no current is flowing through the coil C. Fig. 3 shows the first part of the movement of the arms 90 and 91 caused by the attraction of the armature C' by the coil C when current flows thereto. It will be noticed that in the position shown in Fig. 3, the contact E' has been closed, and contact F is still closed. Fig. 4 shows the end of the travel of the armature C, and it will be seen that E' is closed and F is opened.

In operation of the device, the switch S is closed thus completing a circuit through the contact F, battery G, coil B and bell H, thus ringing the bell. This circuit is referred to as the auxiliary circuit. When current flows through this circuit, the magnet B is energized, thus closing the contacts D and E. The closing of contact E completes a circuit through the secondary coil S", so that the device starts under loaded conditions. Closing of the switch D completes a circuit through the pole-changing device and primary coil S' as described above. The reversal of flow through the coil S' induces an alternating current in the coil S", thus ringing the bell H. Since the apparatus starts under loaded conditions, the current through R produces a voltage drop across R sufficient to cause current to flow through the coil C which closes the switch D' in parallel with D, and also closes the switch E' in parallel with E, and also opens the switch F, thus breaking the auxiliary circuit through the battery G and coil B and opening the switches D and E.

When S is opened, the load is removed from the bell-ringing circuit, which reduces the voltage drop across R sufficiently so that the flow of current through the coil C becomes so slight that the contacts D' and E' will open, and F will close, thus restoring the device to its normal condition. The arms operating the contacts D', E' and F, are all under spring tension so that they will take their normal positions, when the flow of current through the coil C decreases with the removal of load from the apparatus. It will be seen, therefore, that the bell H will give uninterrupted ringing as long as the push button S is held closed.

In Fig. 5 I have shown a modified form of the device. The device here shown has the coil C omitted. The resistance coil R in the modified form is put in the same place as the coil C in the preferred form. The resistance coil R is also provided with a core R', which operates the contacts D', E' and F in the same manner as these contacts are operated by the coil C in the preferred form. The only difference between the two devices is that in the preferred form, the voltage drop across R caused by a load causes current to flow through the coil C to operate the contacts D', E' and F; whereas in the modified form the voltage drop or flow of current across R caused by a load, magnetizes the core R' to operate the contacts D', E' and F.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

Although I have shown a system for energizing a relatively low voltage signaling circuit, it is obvious that any other kind of circuit requiring a relatively low voltage may be energized by my system from a high voltage direct current. I have shown a signaling circuit merely for the purpose of illustrating my invention. Likewise, although I have shown in the signaling circuit a bell to illustrate one form of signaling device, it is obvious that any other kind of signaling device could be used, or in fact, any kind of low voltage translating device. In other words, my invention comprehends the operation of any kind of low voltage translating device from a high voltage direct current. It is also to be noted that in my improved system such energizing of a low voltage translating device from a high voltage direct current is accomplished by means of a system in which the high voltage direct current circuit is entirely open when the system is not in use.

What I claim as new and desire to secure by Letters Patent, is:

1. In a system of the class described; a transformer; a source of relatively high potential direct current connected to a circuit having in series therein the primary winding of the transformer, a pole-changing device, and a switch (D); a low voltage circuit having in series therein the secondary winding of the transformer, a control switch, a low voltage translating device, and a switch (E'); an auxiliary shunt circuit including therein a source of potential, the control switch, and a switch (F); a switch (E) in parallel with the switch (E'); a switch (D') in parallel with the switch (D); means operated by flow of current through the auxiliary shunt circuit for closing the switches (D and E); and means operated by flow of the relatively high potential direct current for closing the switches (D' and E') and opening the switch (F).

2. In a system of the class described; a transformer; a source of relatively high potential direct current connected to a circuit having in series therein the primary winding of the transformer, a pole-changing device, and a switch (D); a low voltage circuit having in series therein the secondary winding of the transformer, a control switch, a low voltage translating device, and a switch (E'); an auxiliary shunt circuit including therein a source of potential, and the control switch; a switch (E) in parallel with the switch (E'); a switch (D') in parallel with the switch (D); means operated by a flow of current through the auxiliary shunt circuit for closing the switches (D and E); and means operated by flow of the relatively high potential direct current for closing the switches (D' and E').

3. In a system of the class described; a transformer; a source of relatively high potential direct current connected to a circuit having in series therein the primary winding of the transformer, a pole-changing device, a switch (D), and a resistance coil (R); a low voltage circuit having in series therein the secondary winding of the transformer, a control switch, a low voltage translating device and a switch (E'); an auxiliary shunt circuit including therein a source of potential and the control switch; a switch (E) in parallel with the switch (E'); a switch (D') in parallel with the switch (D); means operated by a flow of current through the auxiliary shunt circuit for closing the switches (D and E); and means operated by flow of the relatively high potential direct current for closing the switches (D' and E'), said means comprising a magnetic coil connected to the two ends of the resistance coil (R).

4. In a system of the class described; a transformer; a source of relatively high potential direct current connected to a circuit having in series therein the primary winding of the transformer, a pole-changing device, and a switch (D); a low voltage circuit having in series therein the secondary winding of the transformer, a control switch, a low voltage translating device and a switch (E'); an auxiliary shunt circuit including therein a source of potential and the control switch; a switch (E) in parallel with the switch (E'); a switch (D') in parallel with the switch (D); means operated by a flow of current through the auxiliary shunt circuit for closing the switches (D and E); and means operated by flow of the relatively high potential direct current, when the device is under load, for closing the switches (D' and E').

5. In a system of the class described; a transformer; a source of relatively high potential direct current connected to a circuit having in series therein the primary winding of the transformer; means for reversing the direction of flow of current through the primary winding of the transformer; a low voltage circuit having in series therein the secondary winding of the transformer and a low voltage translating device; an auxiliary shunt circuit including therein a source of potential and a control switch; means operated by flow of current through the auxiliary shunt circuit for permitting the high potential direct current to flow through the primary winding of the transformer; means operated by flow of current through the auxiliary shunt circuit for permitting the flow of current from the secondary winding of the transformer to the low voltage translating device; and means operated by flow of the relatively high potential direct current for permitting the flow of current from the secondary winding of the transformer to the low voltage translating device.

6. In a system of the class described; a transformer; a source of relatively high potential direct current connected to a circuit having in series therein the primary winding of the transformer; a low voltage circuit having in series therein the secondary winding of the transformer, a low voltage translating device and a switch (E'); an auxiliary shunt circuit including therein a source of potential and a control switch; a switch (E) in parallel with the switch (E'); means operated by flow of current through the auxiliary shunt circuit for permitting the relatively high potential direct current to flow through the primary winding of the transformer; means operated by flow of current through the auxiliary shunt circuit for closing the switch (E); and means operated by flow of the relatively high potential direct current for closing the switch E'.

7. In a system of the class described; a transformer; a source of relatively high potential direct current connected to a circuit having in series therein the primary winding of the transformer and a switch (D); means for reversing the direction of flow of current through the primary winding of the transformer; a low voltage circuit having in series therein the secondary winding of the transformer, a low voltage translating device and a switch (E'); an auxiliary shunt circuit including therein a source of potential and a control switch; means operated by flow of current through the auxiliary shunt circuit for closing the switch (D); and means operated by flow of the relatively high potential direct current for closing the switch (E').

8. In a system of the class described; a transformer; a source of relatively high potential direct current connected to a circuit having in series therein the primary winding of the transformer and a switch (D); means for reversing the direction of flow of current through the primary winding of the transformer; a low voltage circuit having in series therein the secondary winding of the transformer, a low voltage translating device, and a switch (E'); an auxiliary shunt circuit including therein a source of potential and a control switch; a switch (E) in parallel with the switch (E'); a switch (D') in parallel with the switch (D); means operated by flow of current through the auxiliary shunt circuit for closing the switches (D and E); and means operated by flow of the relatively high potential direct current for closing the switches D' and E'.

9. In a system of the class described; a transformer; a source of relatively high potential direct current connected to a circuit having in series therein the primary winding of the transformer and a switch (D); means for reversing the direction of flow of current through the primary winding of the transformer; a low voltage circuit having in series therein the secondary winding of the transformer, a low voltage translating device, and a switch (E'); an auxiliary shunt circuit including therein a source of potential and a control switch; a switch (D') in parallel with the switch (D); means operated by flow of current through the auxiliary shunt circuit for closing the switch (D); and means operated by flow of the relatively high potential direct current for closing the switch (E').

10. In a system of the class described; a transformer; a source of relatively high potential direct current connected to a circuit having in series therein the primary winding of the transformer and a switch (D); means for reversing the direction of flow of current through the primary winding of the transformer; a low voltage circuit having in series therein the secondary winding of the transformer, a low voltage translating device and a switch (E'); an auxiliary shunt circuit including therein a source of potential, a control switch, and a switch (F); a switch (E) in parallel with the switch (E'); a switch (D') in parallel with the switch (D); means operated by flow of current through the auxiliary shunt circuit for closing the switches (D and E); and means operated by flow of the relatively high potential direct current for closing the switches (D' and E') and opening the switch (F).

11. In a system of the class described; a transformer; the primary winding on the transformer adapted to be energized by a source of high potential direct current; means for reversing the direction of flow of current through the primary winding of the transformer; a low voltage circuit having in series therein a low voltage translating device and adapted to be energized by the secondary winding of the transformer; an auxiliary low voltage shunt circuit including therein a source of potential and a control switch; means operated by flow of current through the auxiliary shunt circuit for permitting flow of current from the source of high potential direct current through the primary winding of the transformer; and means operated by flow of the high potential direct current for permitting flow of current from the secondary winding of the transformer to the low voltage translating device.

12. In a system of the class described; a transformer; the primary winding on the transformer adapted to be energized by a source of high potential direct current; means for reversing the direction of flow of current through the primary winding of the transformer; a low voltage circuit having in series therein a low voltage translating device and adapted to be energized by the secondary winding of the transformer; an auxiliary low voltage shunt circuit including a source of potential and a control switch; means operated by flow of current through the auxiliary shunt circuit for permitting flow of current from the source of high potential direct current through the primary winding of the transformer; means operated by flow of current through the auxiliary shunt circuit for permitting flow of current from the secondary winding of the transformer to the low voltage translating device; means operated by flow of the high potential direct current for maintaining said flow; and means operated by flow of the high potential direct current for permitting flow of current from the secondary winding of the transformer to the low voltage translating device.

13. In a system of the class described; a transformer; the primary winding on the transformer adapted to be energized by a source of high potential direct current; means for reversing the direction of flow of current through the primary winding of the transformer; a low voltage circuit having in series therein a low voltage translating device and adapted to be energized by the secondary winding of the transformer; an auxiliary low voltage shunt circuit including therein a source of potential and a control switch; means operated by flow of current through the auxiliary shunt circuit for permitting flow of current from the source of high potential direct current through the primary winding of the transformer; means operated by flow of current through the auxiliary shunt circuit for permitting flow of current from the secondary winding of the transformer to the low voltage translating device; means operated by flow of the high potential direct current for maintaining said flow; means operated by flow of the high potential direct current for permitting flow of current from the secondary winding of the transformer to the low voltage translating device; and means operated by flow of the high potential direct current for cutting off flow of current from the source of potential in the auxiliary low voltage circuit.

14. In a system of the class described; a transformer; a source of relatively high potential direct current connected to a circuit having in series therein the primary winding of the transformer, a pole-changing device, and a switch (D); a low voltage circuit having in series therein the secondary winding of the transformer, a control switch, a low voltage translating device, and a switch (E'); an auxiliary shunt circuit including therein a source of potential, and the control switch; a switch (E) in parallel with the switch (E'); means operated by a flow of current through the auxiliary shunt circuit for closing the switches (D and E); and means operated by flow of the relatively high potential direct current for closing the switch (E').

15. In a system of the class described; a transformer; a source of relatively high potential direct current connected to a circuit having in series therein the primary winding of the transformer, a pole-changing device, a switch (D), and a resistance coil (R); a low voltage circuit having in series therein the secondary winding of the transformer, a control switch, a low voltage translating device and a switch (E'); an auxiliary shunt circuit including therein a source of potential and the control switch; a switch (E) in parallel with the switch (E'); means operated by a flow of current through the auxiliary shunt circuit for closing the switches (D and E); and means operated by flow of the relatively high potential direct current for closing the switch (E'), said means comprising a magnetic coil connected to the two ends of the resistance coil (R).

16. In a system of the class described; a transformer; a source of relatively high potential direct current connected to a circuit having in series therein the primary winding of the transformer, a pole-changing device, and a switch (D); a low voltage circuit having in series therein the secondary winding of the transformer, a control switch, a low voltage translating device and a switch (E'); an auxiliary shunt circuit including therein a source of potential and a control switch; a switch (E) in parallel with the switch (E'); means operated by a flow of current through the auxiliary shunt circuit for closing the switches (D and E); and means operated by flow of the relatively high potential direct current, when the device is under load, for closing the switch (E').

In witness whereof I have hereunto set my hand this 2nd day of August, 1921.

CHARLES A. NASH.